United States Patent
Gessler et al.

(10) Patent No.: US 6,299,564 B1
(45) Date of Patent: Oct. 9, 2001

(54) HYDRAULIC CONTROL SYSTEM FOR A CVT

(75) Inventors: Klaus Gessler, Friedrichshafen; Bernd Fessler, Kressbronn; Hubert König, Tettnang; Stefan Sommer, Saulgau, all of (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/528,315

(22) Filed: Mar. 20, 2000

(30) Foreign Application Priority Data

Apr. 1, 1999 (DE) .............................. 199 14 931

(51) Int. Cl.[7] .............................................. F16H 61/100
(52) U.S. Cl. .................................. 477/45; 474/28
(58) Field of Search ................... 477/44, 45, 46; 474/28

(56) References Cited

U.S. PATENT DOCUMENTS

| | | | |
|---|---|---|---|
| 4,601,680 | 7/1986 | Tokoro et al. | 474/11 |
| 5,888,168 * | 3/1999 | Niiyama et al. | 477/49 |
| 6,117,045 * | 9/2000 | Hopper | 477/44 |
| 6,224,509 * | 5/2001 | Gierling | 477/45 |

FOREIGN PATENT DOCUMENTS

| | | |
|---|---|---|
| 44 36 506 A1 | 4/1996 | (DE) . |
| 195 33 976 A1 | 3/1997 | (DE) . |
| 0 634 590 A1 | 1/1995 | (EP) . |
| 9-105457 * | 4/1997 | (JP) . |

* cited by examiner

Primary Examiner—Charles A. Marmor
Assistant Examiner—Ankur Parekh
(74) Attorney, Agent, or Firm—Davis & Bujold, P.L.L.C.

(57) ABSTRACT

A system for control of a CVT driven by a drive unit has an electromagnetically controlled pressure-control valve which actuates both a main pressure valve and a secondary valve for the secondary pulley wherein geometry and spring tension of a main pressure valve and the secondary valve provide different characteristic lines.

5 Claims, 4 Drawing Sheets

HYDRAULIC CONTROL SYSTEM FOR A CVT

BACKGROUND OF THE INVENTION

The instant invention concerns a system for control of a CVT driven by an input unit.

Continuously variable automatic transmissions, also called CVT, for motor vehicles are usually comprised of a start-up unit, a forward/reverse drive unit, a variator, an intermediate shaft, a differential and a hydraulic and electronic control unit. The CVT is driven by an internal combustion engine, via an input shaft, particularly the crankshaft. A start-up unit serves either a start-up clutch or a hydrodynamic converter. The forward/reverse drive unit serves for reversal of direction of rotation for forward or reverse drive and usually consists of a planetary reversing gear.

The variator consists of two bevel pulley pairs and a belt-type organ, each bevel pulley pair having a first bevel pulley axially stationary and a second bevel pulley axially movable. Hereinafter the bevel pulleys disposed on the input will be designated as primary pulley and the bevel pulleys disposed on the output as secondary pulley. Between the two pairs of bevel pulleys rotates the belt-type organ such as a sliding link conveyor.

The running radius of the belt-type organ and therewith the ratio of the CVT change by adjustment of the bevel pulleys. The second bevel pulley pair is non-rotatably connected with one output shaft which transmits the torque to an intermediate shaft via a pair of gears. The intermediate shaft serves for reversal of direction of rotation and adaptation of torque and rotational speed. The torque of the intermediate shaft is transmitted to the differential via one other pair of gears.

The control or regulation of the CVT is carried out by the electronic control unit via the hydraulic control unit. The hydraulic control unit contains electromagnetic actuators and hydraulic valves. A pump conveys the pressure medium from the lubricant sump to the hydraulic control unit and to the consumers of the CVT.

EP-A 0 634 590 has disclosed a system for hydraulic control of a CVT. The primary pulley and the secondary pulley are each adjusted via a hydraulic valve. The first valve controls the primary pulley and the second valve controls the secondary pulley. Both the first and second valves are pre-controlled by an electromagnetic pressure regulator. The second valve is here supplied with pressure medium by a pump, the pressure supply of the first valve being adjusted via a control edge of the second valve. The pressure level of the supply line for the first valve is thus identical with the pressure level delivered by the pump. The disadvantage resulting from this arrangement is that the pressure level of the secondary pulley cannot be adjusted below the minimal pressure level provided by the pump so that an overpressure between the secondary pulley and a belt-type organ results in a reduction in efficiency.

To overcome said disadvantage, the applicant's patent application 195 33 976.2 has already proposed a hydraulic system for a CVT preferably driven by an internal combustion engine having a common central first hydraulic branch in which a first pressure level prevails and which is fed by a pump from which a specific pressure supply branches off from the first hydraulic branch to each consumer; the consumers are here the primary pulley, the secondary pulley, the clutch or brake of the forward-reverse drive unit, the start-up unit and the lubrication points of the CVT. In each pressure feed to a consumer are located both a hydraulic valve and an electromagnetic pressure-control valve associated therewith in a manner such that the electronic pressure-control valve determines via the hydraulic valve the pressure level in the pressure feed of the consumer. The electromagnetic valves are, in this case, situated in a second hydraulic branch.

From the applicant's DE-P 44 36 506.3 is known a system for control of a CVT driven by an input unit which has a so-called emergency device, with two emergency valves, which is activated in case of failure of the electronic control unit and which provides a constant pressure ratio or power ratio between primary pulley and secondary pulley, the pressure level of an adjusting chamber of the secondary pulley then being constant. The first emergency valve is connected with the primary valve for the primary pulley and the secondary emergency valve with the secondary valve for the secondary pulley; the shift positions of both emergency valves are determined by an electromagnetic pressure-control valve in a manner such that in a first position of both emergency valves a first pressure-control valve acts upon the primary valve pre-controlling it and a second pressure-control valve acts upon the secondary valve pre-controlling it while in a second position of both emergency valves the pressure level of a pressure-reducing valve acts upon the primary valve and the secondary valve pre-controlling them.

The problem to be solved by the present invention is to propose a system for control of a CVT which offers the same advantages and reliability as the systems already known but, at the same time, simplifies construction and thus more economical production.

SUMMARY OF THE INVENTION

The invention provides that the main pressure valve and the hydraulic secondary valve for the secondary pulley be connected with a common electromagnetically controlled pressure-control valve and that geometry and spring tension of main pressure valve and secondary valve be designed so that the two valves have different characteristic lines.

The valve characteristic lines are, at the same time, defined so that in the range of high ratio of the transmission (overdrive) the primary pressure in the primary valve is higher than the secondary pressure in the secondary valve, but that in the remaining ratio ranges of the transmission, it is lower than the secondary pressure.

A pressure sensor is preferably located in the line between the secondary valve and the secondary pulley.

In order that the control pressure, provided by the common pressure-control valve, is ensured, even in case of leakages, on the active diameters of the main pressure valve and the secondary valve, it is advantageous that, on the pressure-control valve, a volume reinforcing valve is rear-mounted.

In another advantageous embodiment, the electromagnetic pressure-control valve acts only upon the main pressure valve, while the secondary valve is designed as a pressure-reducing valve in which a secondary pressure is set to a constant value which is lower than the main pressure.

Hence, the inventive system makes it possible to omit a pressure regulator, since the main pressure is coupled with the contact pressure whereby lowering to zero bar of the contact pressure is possible. The required variation between main pressure and contact pressure is obtained here by different characteristic line curves of the two valves. Unlike the systems known from the prior art, the main pressure is not directly connected with the contact pressure. Subject to a corresponding aspect ratio of primary and secondary pulleys, in all driving states needed the marginal conditions are kept as needed, since the contact pressure is lower than the main pressure. The main pressure valve and the secondary valve are, therefore, controlled either via a common pressure regulator, wherein it is possible to implement two different characteristic lines by spring characteristic and valve ratio, or by direct attachment of the secondary valve to the main pressure valve, the secondary valve being a pressure-reducing valve.

It is, therefore, possible with the inventive system to implement low contact pressures combined with high adjustment gradients.

BRIEF DESCRIPTION OF THE DRAWINGS

The invention is explained in detail herebelow with reference to the drawings where the two embodiments are diagrammatically shown. In the drawings.

DESCRIPTION OF THE PREFERRED EMBODIMENTS

Figure 1:
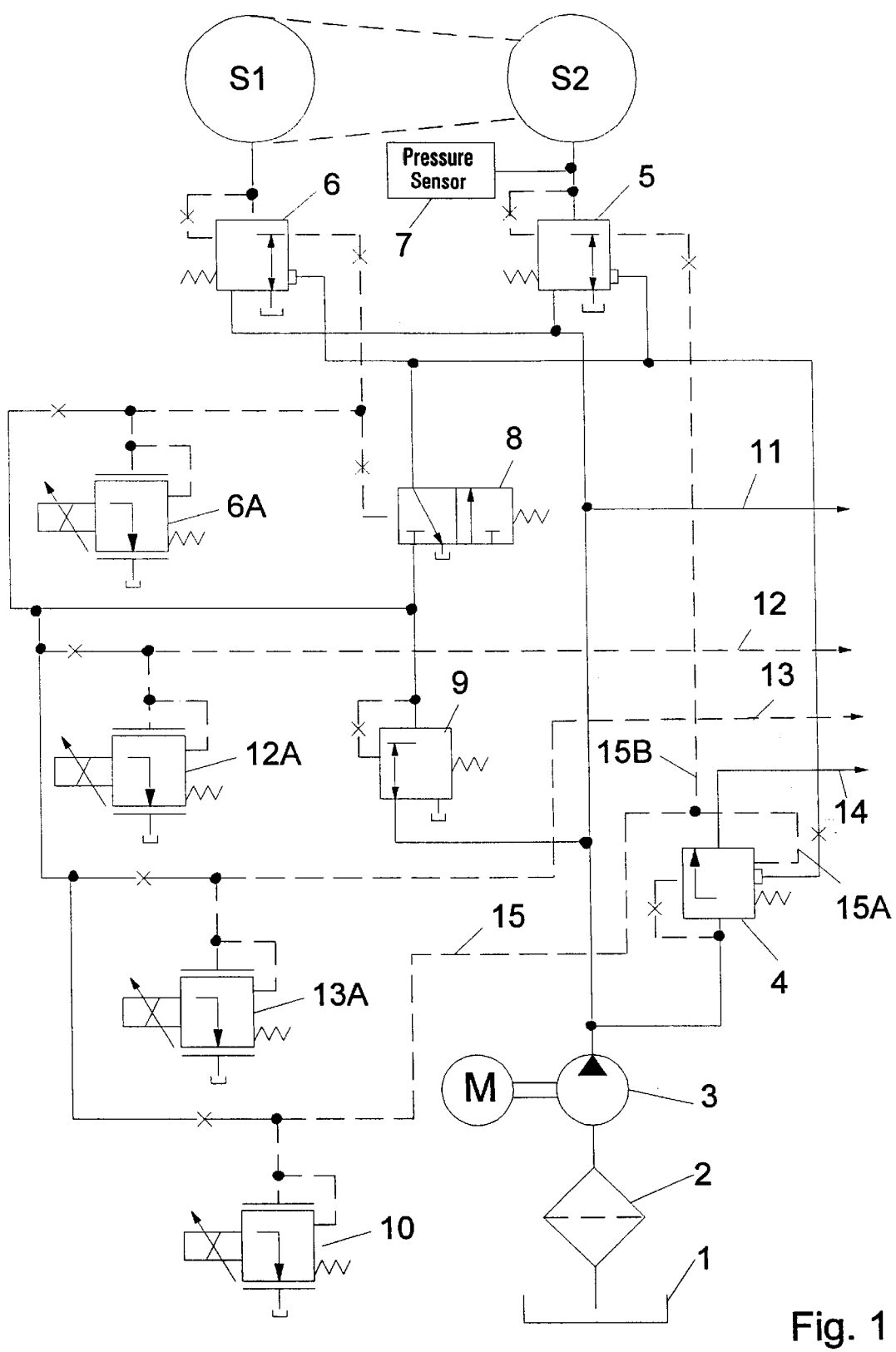
FIG. 1 shows part of a control diagram in relation to the first embodiment.
Figure 2:
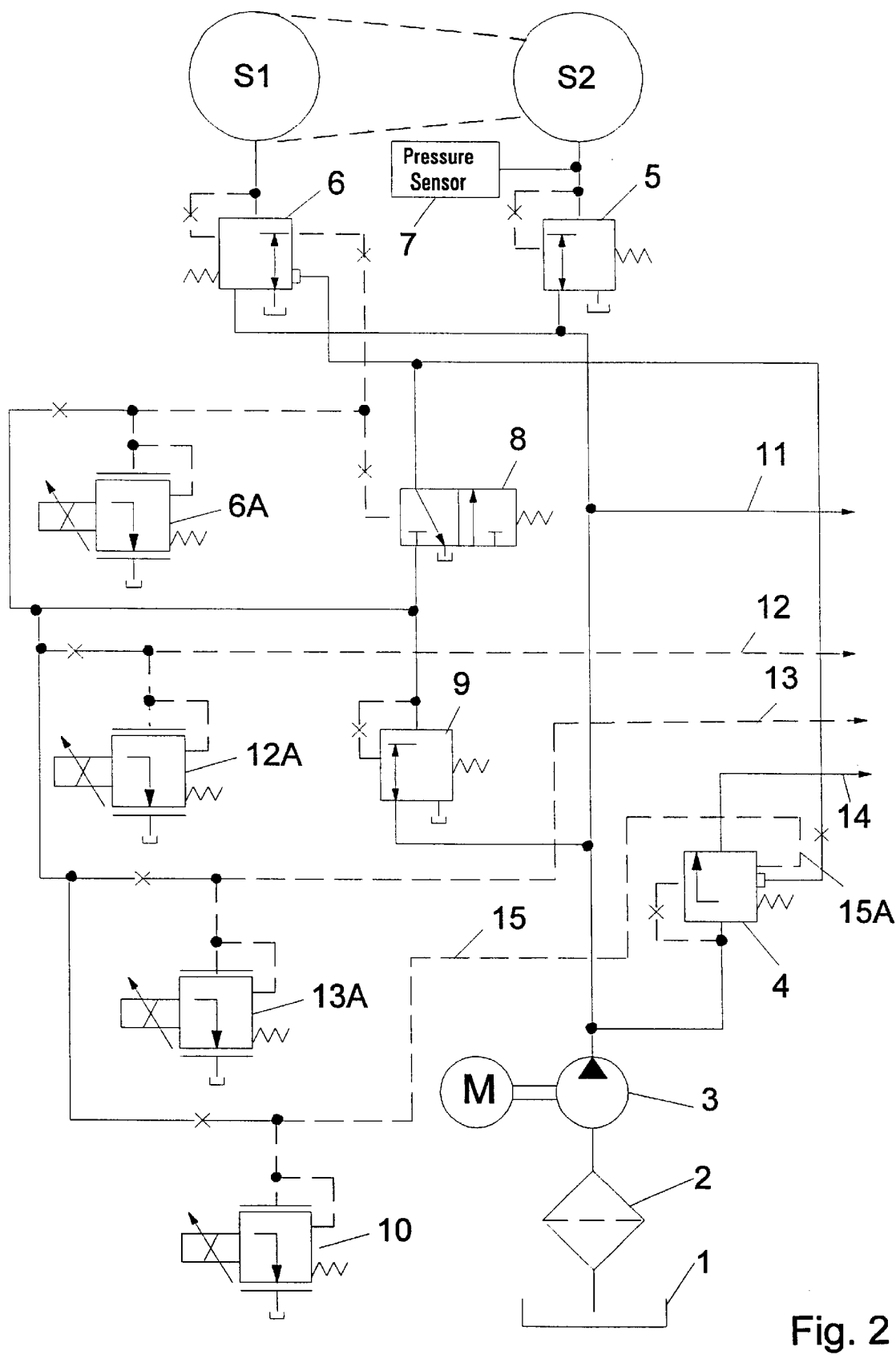
FIG. 2 shows part of a control diagram in relation to the second embodiment.

In FIGS. 1 and 2, where the same parts are provided with the same reference numerals, only the parts needed for understanding of the invention have been given a number. In a conventional manner, the system has a lubricant sump 1 from which the oil from a pump 3 is sucked via a filter 2. With S1 is designated a first bevel pulley pair, having a primary pulley and with S2 a second bevel pulley pair, having a secondary pulley pair, of the variator for the CVT, the belt-type organ being indicated in dotted lines. With 6 is designated the primary valve for adjusting the primary pulley movable in axial direction and with 5 the secondary valve for adjusting the secondary pulley movable in axial direction. With 4 is designated the conventional main pressure valve, with 8 an emergency valve for emergency drive operation, with 9 a pressure-reducing valve and with 11, 12, 13 and 14 branches to other consumers (not shown here), such as hydrodynamic converters, forward/reverse drive unit, lubrication points, etc. The pressure is supplied to the branches 12 and 13 in a conventional manner with individual pressure regulators 12A and 13A, e.g. to control a forward/reverse drive unit and a converter clutch. Likewise, the primary valve 6 is conventionally controlled via an individual pressure regulator 6A.

According to the invention, in the embodiment shown in FIG. 1, a common pressure regulator 10 which acts upon both valves is now provided for the main pressure valve 4 and for the secondary valve 5 for the secondary pulley. With 7 is designated a sensor that detects the pressure in the line between secondary valve 5 and the secondary pulley. The signals of the pressure sensor 7, together with other variables dependent on the driving state, such as engine rotational speed, engine torque and variator ratio, are evaluated in an electronic gear control unit (not shown), wherein a pressure standard is calculated for the pressure regulator 10. The control pressure of which is fed via the control lines 15, 15A to the main pressure valve 4 and via the control lines 15, 15B to the secondary pressure valve 5. In order that the control pressure, provided by the pressure regulator 10, is ensured in case of leakages on the active diameters of the main pressure valve 4 and of the secondary valve 5, it is advantageous that a volume-reinforcing valve (not shown) in particular is mounted on the rear of the pressure regulator 10.

The design of main pressure valve 4 and secondary valve 5 is optional. The valve characteristic lines, i.e. gradient and center distance, are determined only by the geometry and spring tension selected. In the design of both valves care must be taken that the pressure (primary pressure, secondary pressure) required by the variator, i.e. the primary pulley and the secondary pulley, is also adjustable. It is required that the primary pressure is higher than the secondary pressure in the range of overdrive ratio of the transmission.

Therefore, main pressure and contact pressure are hereby coupled, a reduction of the contact pressure to zero bar being possible. The variation between the main pressure and the contact pressure is obtained by different characteristic line curves of the valves; unlike the existing designs wherein both the main pressure valve and the secondary valve have associated their own electromagnetic pressure-control valve, the main pressure is not directly connected with the contact pressure. Subject to an adequate aspect ratio of primary pulley to secondary pulley, the marginal conditions are observed in all driving states, i.e. the contact pressure is lower than the main pressure. Therefore, the main pressure valve 4 and the secondary valve 5 are controlled, via the common electromagnetically controlled pressure-control valve 10, and it is possible to implement two different pressure characteristic lines by spring characteristic lines by spring characteristic and valve ratio.

In the embodiment, shown in FIG. 2, the electromagnetically controlled pressure-control valve 10 acts only upon the main pressure valve 4. The secondary valve 5 is a pressure-reducing valve and adjusts a secondary pressure which is a constant value is lower than the main pressure. Therefore, a direct attachment of the secondary valve 5 to the main pressure valve 4 occurs and, it is necessary that the secondary valve be a pressure-reducing valve.

Figure 3A:
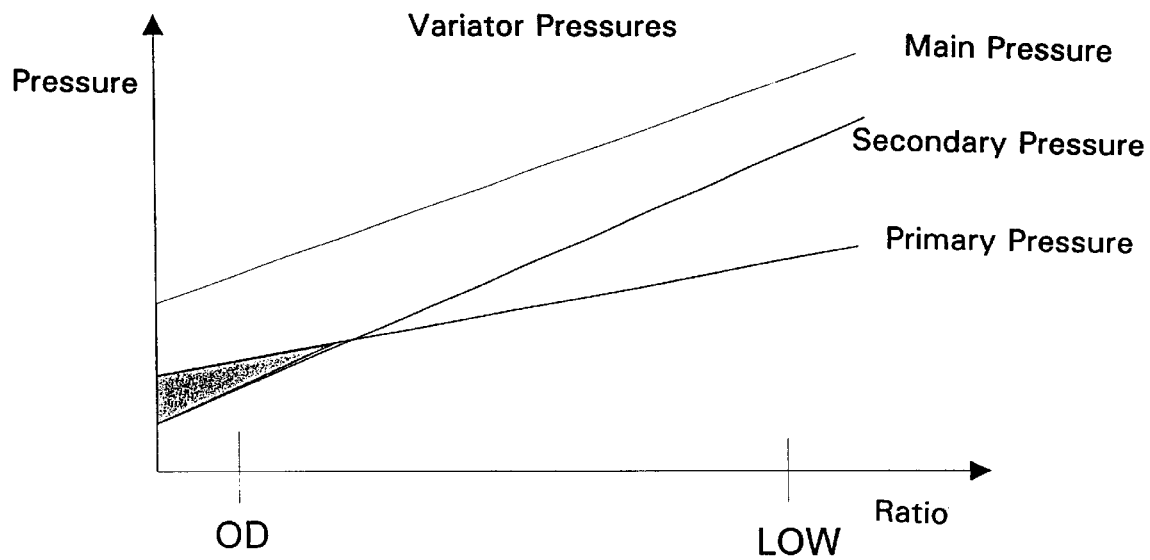
FIGS. 3A and 3B and FIGS. 4A and 4B show graphic representations of the required variator pressures or valve characteristic lines for both embodiments.

In relation to the embodiment of FIG. 1, FIG. 3A shows a graphic representation of the variator pressures, the pressure being plotted on the ordinate and the ratio range of the transmission on the abscissa. It is detected that the main pressure is higher than the secondary pressure and the primary pressure and that, in the range of high ratio of the transmission, i.e. in overdrive (OD) range, the primary pressure for the primary pulley is higher than the secondary pressure for the secondary pulley, but not in the remaining ratio range.

Figure 3B:
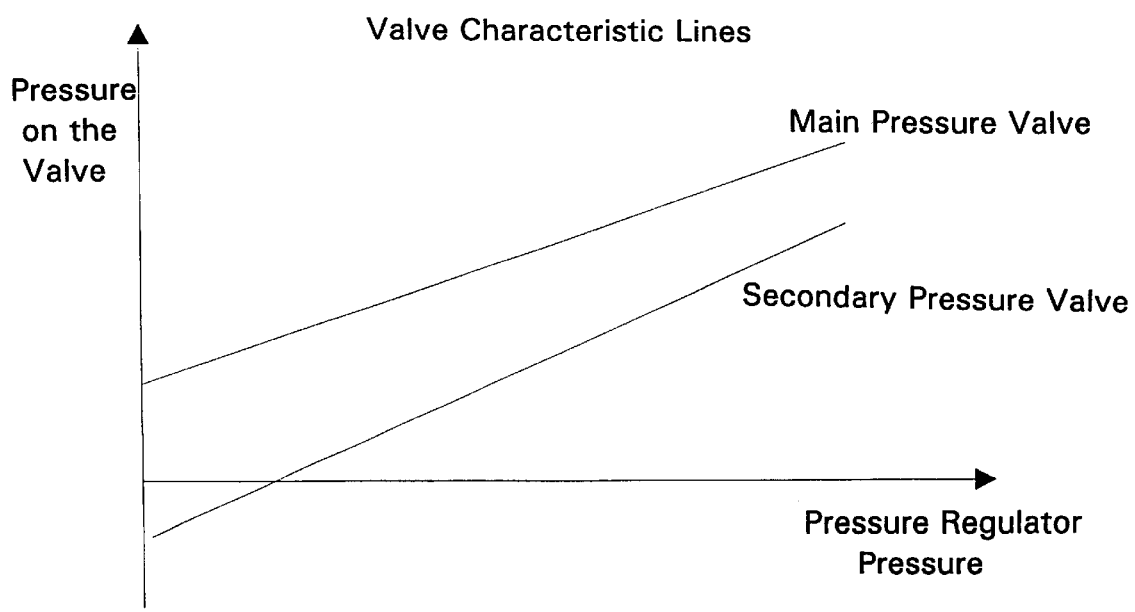

In relation to FIG. 1, FIG. 3B required valve characteristic lines, here there is plotted the pressure of the valve on the ordinate and the pressure of the electromagnetic pressure-control valve on the abscissa. In all ranges, the main pressure is higher than the secondary pressure, i.e. the contact pressure is lower than the main pressure.

Figure 4A:
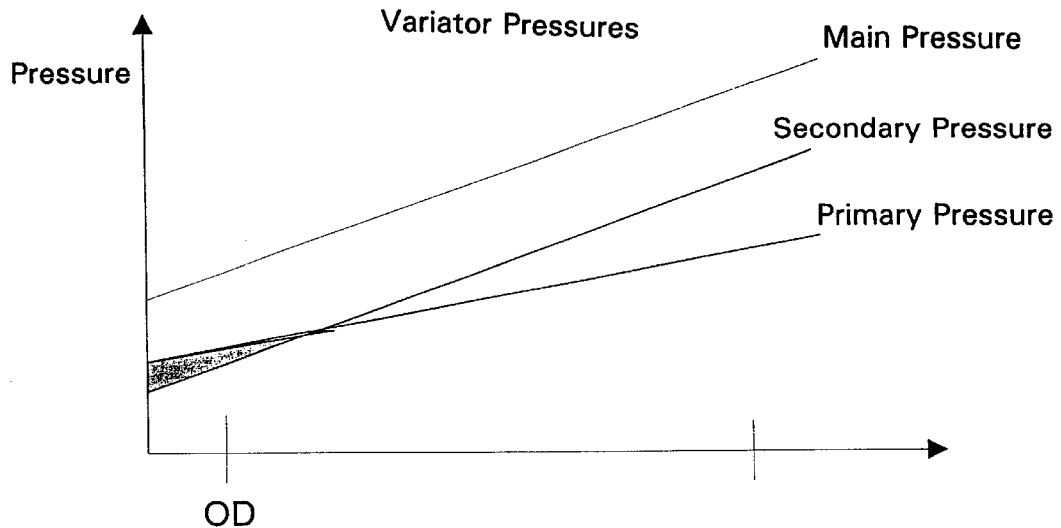
Figure 4B:
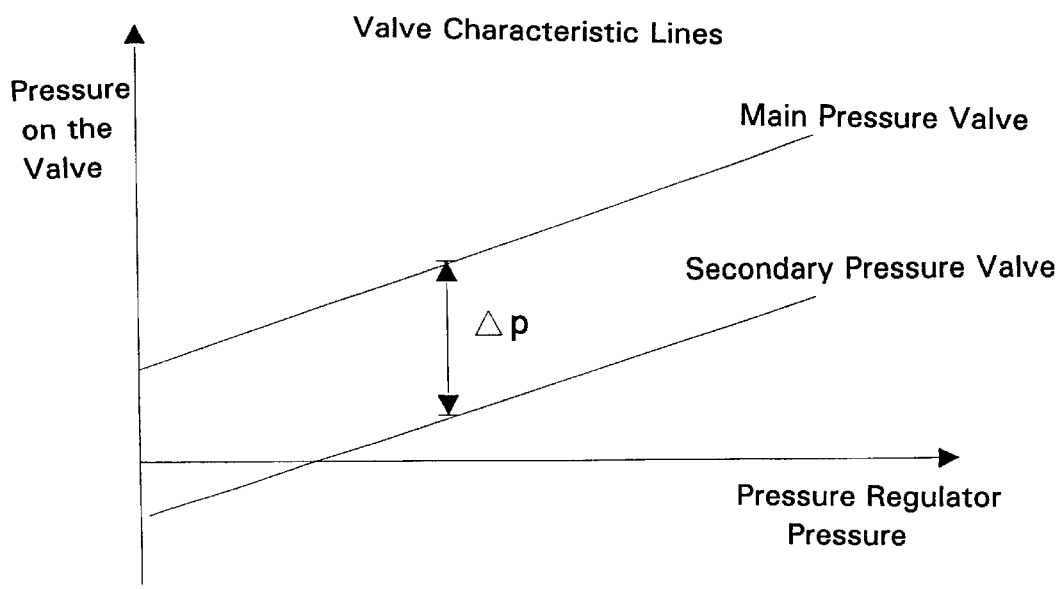

In relation to the embodiment of FIG. 2, FIGS. 4A and 4B show the graphic representations for variator pressures and valve characteristic lines. In FIG. 4A, the characteristic lines for the main pressure valve and the secondary pressure valve extend parallel, the primary pressure also is again in the range of high ratio, i.e. in the overdrive range, higher than the secondary pressure, but not in the remaining ratio range.

In the valve characteristic lines, shown in FIG. 4B, the secondary pressure is lower by a constant value $\Delta p$ than the main pressure, since the secondary valve is designed as a pressure-reducing valve.

| Reference numerals | |
|---|---|
| 1 | lubricant sump |
| 2 | filter |
| 3 | pump |
| 4 | main pressure valve |
| 5 | secondary valve |
| 6 | primary valve |
| 6A | electromagnetic pressure-control valve |
| 7 | pressure sensor |
| 8 | emergency valve |
| 9 | pressure-reducing valve |
| 10 | electromagnetic pressure-control valve |
| 11 | branch |
| 12 | branch |
| 12A | electromagnetic press-control valve |
| 13 | branch |
| 13A | electromagnetic press-control valve |
| 14 | branch |
| 15 | control line |
| 15A | control line |
| 15B | control line |
| S1 | primary pulley pair |
| S2 | secondary pulley pair |

What is claimed is:

1. A system for control of a CVT driven by a drive unit comprising a bevel pulley (S1, S2) pair on each of the input and output shaft and a belt-type organ drivingly connecting the pulley pair, wherein the bevel pulley pair on the input shaft has an axially stationary bevel pulley and an axially movably primary pulley, and the bevel pulley pair on the output shaft has an axially stationary bevel pulley and a secondary pulley axially movably controlled, and a hydraulic control unit with electromagnetic actuators and hydraulic valves controlled by an electronic control unit, wherein with said primary pulley and said secondary pulley are respectively associated with a primary valve (6) and a secondary valve (5) which provide adjustment of the primary pulley and the secondary pulley respectively and therewith a change of ratio of the CVT, the main pressure valve (4) and the secondary valve (5) being connected with a common electromagnetically controlled pressure-control valve (10) and the main pressure valve (4) and the secondary valve (5) having a geometry and spring tension respectively so that the main pressure valve (4) and the secondary valve (5) have different characteristics.

2. The system according to claim 1, wherein said valve characteristics are such that the primary pressure in said primary valve (6) is higher in the range of a high ratio of the transmission (overdrive) than the secondary pressure in said secondary valve (5) but lower than the secondary pressure in a lower ratio range of the transmission.

3. The system according to claim 1, wherein a pressure sensor is situated in a line between the secondary valve (5) and an actuator controlling axial movement of the secondary pulley.

4. The system according to claim 1, wherein a volume-reinforcing valve is mounted on the rear of said common pressure control valve (10) for the main pressure valve (4) and the secondary valve (5).

5. A system for control of a CVT driven by a drive unit comprising a bevel pulley (S1, S2) pair on each of an input and output shaft and a belt-type organ drivingly connecting the pulley pairs wherein the bevel pulley pair on the input shaft has an axially stationary bevel pulley and an axially movably primary pulley, and the bevel pulley pair on the output shaft has an axially stationary bevel pulley and a secondary pulley axially movably controlled, and a hydraulic control unit with electromagnetic actuators and hydraulic valves controlled by an electronic control unit, wherein with said primary pulley and said secondary pulley are respectively associated with a primary valve (6) and a secondary valve (5) which provide adjustment of the primary pulley and the secondary pulley respectively and therewith a change of ratio of the CVT, wherein an electro-magnetically controlled pressure-control valve (10) acts upon a main pressure valve (4) and the secondary valve (5) is a pressure-reducing valve arranged such that the pressure of the secondary valve (5) is lower by a constant value ($\Delta p$) than the pressure of the main pressure valve (4).

* * * * *